(No Model.) 2 Sheets—Sheet 1.

B. MEDINA-SANTURIO.
FILTER.

No. 509,441. Patented Nov. 28, 1893.

Witnesses:
E. B. Bolton
E. K. Sturtevant

Inventor:
Bonifacio Medina-Santurio
By Richardson
his Attorneys.

(No Model.) 2 Sheets—Sheet 2.

B. MEDINA-SANTURIO.
FILTER.

No. 509,441. Patented Nov. 28, 1893.

Witnesses:
E. B. Bolton
E. K. Sturtevant

Inventor
Bonifacio Medina-Santurio
By Richards & Co.
his Attorneys.

THE NATIONAL LITHOGRAPHING COMPANY,
WASHINGTON, D. C.

UNITED STATES PATENT OFFICE.

BONIFACIO MEDINA-SANTURIO, OF SEVRAN, FRANCE.

FILTER.

SPECIFICATION forming part of Letters Patent No. 509,441, dated November 28, 1893.

Application filed March 8, 1893. Serial No. 465,160. (No model.)

*To all whom it may concern:*

Be it known that I, BONIFACIO MEDINA-SANTURIO, engineer, residing at present in Sevran, Department of Seine-et-Oise, Republic of France, have invented certain new and useful Improvements in Filters, of which the following is a specification.

This invention relates to an apparatus for filtering liquids for industrial or domestic purposes and particularly for filtering water, and it has for its purpose to effect a rapid filtering operation, by providing an apparatus capable of being cleansed rapidily and easily, without it being necessary to take the apparatus, or portions thereof, apart.

The novel features of the invention consist in the employment of hollow filtering disks fitted side by side upon a hollow axis acting as a collector for the filtrate. In order to obtain a maximum filtering surface, the walls of the disks are formed with concentric undulations. The disks and collector are arranged inside a vessel in such a manner as to be able to be rotated therein; the vessel is partly filled with sand for periodically cleansing the outer surfaces of the disks and it is provided with a system of perforated diaphragms and ducts for the inlet of the water or liquid to be filtered and for the inlet and outlet of the water used for the cleansing operation, together with the impurities carried away therewith.

Figure 1:
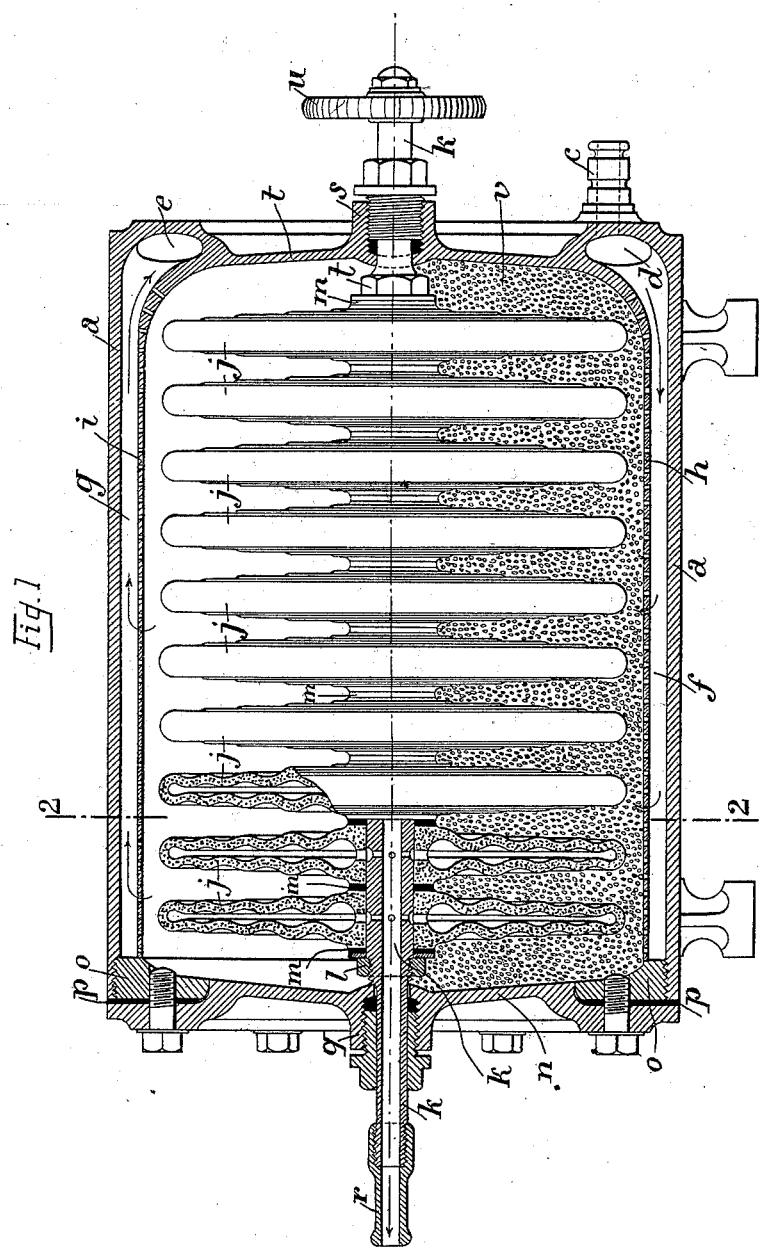
Figure 3:
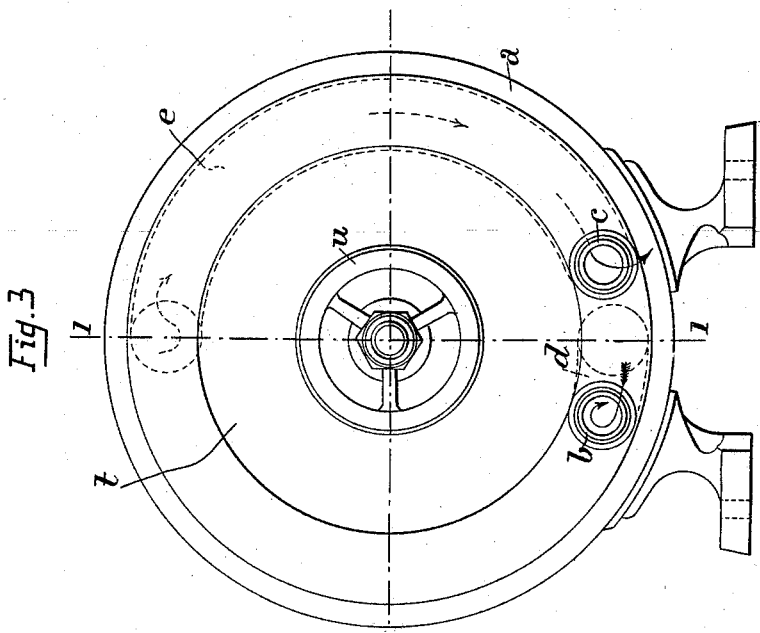
Figure 2:
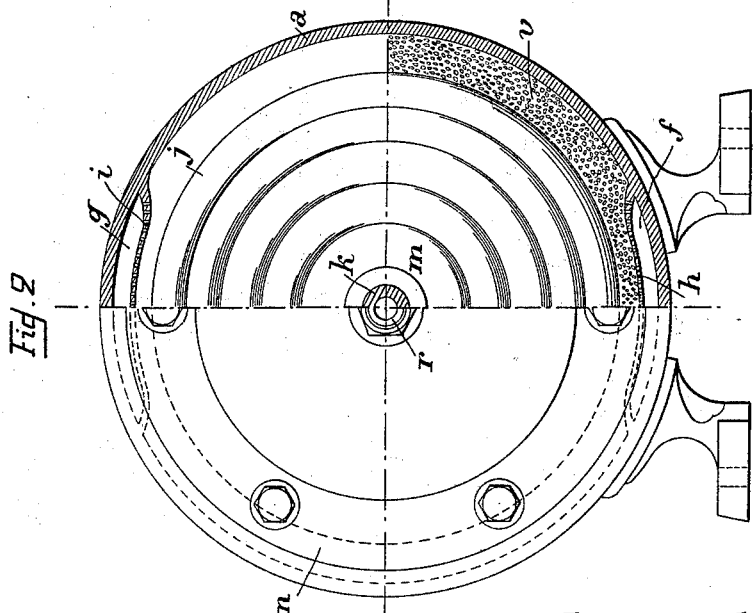

In the annexed drawings, Figure 1 is a longitudinal section on the line 1, 1, Fig. 3, of my improved filter. Fig. 2 is an end elevation, viewing Fig. 1 from left to right, partly in cross section on the line 2, 2. Fig. 3 is an external end elevation, viewing Fig. 1 from right to left.

$a$ is an outer casing or vessel; at its rear end, it is provided with two nozzles $b$ and $c$, which communicate through the respective ducts $d$ and $e$ with spaces $f$ and $g$ formed between the casing $a$ and perforated diaphragms $h$ and $i$. See the dotted lines in Fig. 3.

$b$ is the nozzle for the inlet of the water to be filtered or for the water used for the cleansing operation.

$c$ is the nozzle for the outlet of the water used for the cleansing operation, together with the impurities carried away therewith.

$j, j$ represent the filtering mediums formed of disks made of suitable porous material, such as porcelain or a mixture of porcelain with asbestus, or the like. The said disks are hollow and are concentrically undulated, as shown, with a view of presenting a large filtering surface, the water to be filtered passing through them from the outside to the inside; they communicate internally with a collecting tube $k$ acting as an axis upon which the said disks $j, j$ are mounted side by side. The disks $j$ are held upon the tube $k$ by means of nuts $l, l$ screwed upon its ends and by means of rubber or other suitable washers $m$ interposed between the adjacent disks $j$, and between the outer disks and the nuts $l, l$. The washers $m$ form tight joints upon the collecting tube $k$ and prevent the non-filtered water contained in the casing $a$ from finding its way into the said tube.

$n$ is a cylinder-head bolted to a ring $o$; the latter is screwed into the front end of the vessel $a$, a packing $p$ being interposed between the head $n$ and the ring $o$, for securing a liquid-tight joint. The head $n$ is provided with a nozzle $q$ through which passes a water-tight extension of the collecting tube $k$, upon which latter is fastened a nozzle $r$ for receiving the filtrate. The rear end of the collector $k$ passes in a water-tight nozzle $s$ formed in the end $t$ of the vessel $a$ and carries a hand-wheel $u$, by which rotary motion can be imparted to the collector $k$. For apparatus of large sizes, the hand-wheel $u$ can be replaced by a belt-pulley or a tooth-wheel through which the collector can be geared with any appropriate driving mechanism.

The vessel $a$ is charged to about the level of the axis of the collector $k$ with a sand-filling $v$ into which dips the lower half of each of the filtering disks $j$.

The operation is as follows: The water to be filtered enters at $b$, fills the chamber $f$ and passes through the perforated diaphragm $h$ and the sand $v$, after which it reaches the filtering disks $j$, through the porous walls of which it passes and then flows in a filtered condition, into the collector $k$ from which it can be received through the nozzle $r$. As after a certain time the quantity of filtrate decreases, the external surfaces of the filtering disks require to be cleansed. For this purpose, a rotary movement is imparted by the hand-wheel $u$ to the collector $k$ and disks $j$, whereby the latter are caused to turn amid the sand-filling $v$, which thus frees the external surfaces of the disks from all impurities adhering thereto. The sand-filling $v$ itself can be readily cleansed. For this purpose, a strong current of water is introduced through the nozzle $b$, whereby the sand is subjected to a violent motion during which its molecules are rubbed against each other and are thus deprived of the impurities which have been removed from the disks $j$; the said impurities are carried off, with the water used for the cleansing operation, through the perforations of the diaphragm $i$ into the chamber $g$ and are subsequently expelled with the said water through the nozzle $c$ and duct $e$. The perforations of the diaphragms $h$ and $i$ should be of such a size as to retain the particles of sand.

From the foregoing, it will be readily understood that the hereinbefore described special construction of filter is capable of yielding a considerable amount of filtrate, the amount only depending upon the number and diameter of the filtering disks. Furthermore, the improved construction offers an important advantage, viz: that of enabling the apparatus to be at all times cleansed with rapidity and facility, so that the apparatus may relatively always be kept within its normal filtering capacity. Finally, it will also be apparent that the apparatus need not in any way be taken apart when the filtering mediums require to be cleansed, and that such cleansing operation may even be performed, if desired, without stopping the operation of the filter.

Having now particularly described and ascertained the nature of the said invention and in what manner the same is to be performed, I declare that what I claim is—

1. For filtering liquids, the improved apparatus comprising a series of hollow permeable disks $j$ a hollow shaft $k$, on which the disks are mounted, a casing $a$ inclosing the disks and shaft, an inlet $b$ for the liquids to be filtered a passage $f$ running along the bottom of the casing and having a top containing perforations for the admission of the unfiltered liquid, a passage $d$ leading from the inlet $b$ to the passage $f$, a volume of sand $v$ in the lower part of the casing above the passage $f$, and an outlet $r$ for the filtered water at one end of the hollow shaft $k$, substantially as herein described.

2. For filtering liquids, the improved apparatus comprising a series of hollow permeable disks $j$, a hollow shaft $k$ on which the disks are mounted a casing $a$ inclosing the disks and shaft, an inlet $b$ for the liquid to be filtered, a passage $g$ running along the top of the casing and having a bottom containing perforations for the escape of the wash out water and impurities, a passage $e$ leading from the passage $g$ to the outlet $c$, a volume of sand $v$ in the lower part of the casing and an outlet $r$ for the filtered water at one end of the hollow shaft $k$, substantially as herein described.

3. For filtering liquids, the improved apparatus comprising a series of hollow permeable disks $j$, a hollow shaft $k$ on which the disks are mounted, a casing $a$ inclosing the disks and shaft, an inlet $b$ for the liquid to be filtered, a passage $f$ running along the bottom of the casing and having a top containing perforations for the admission of the unfiltered liquid, a passage $d$ leading from the inlet $b$ to the passage $f$, a passage $g$ running along the top of the casing and having a bottom containing perforations for the escape of the wash-out water and impurities, a passage $e$ leading from the passage $g$ to the outlet $c$, a volume of sand $v$ in the lower part of the casing and an outlet $r$ for the filtered water at one end of the hollow shaft $k$, substantially as herein described.

In witness whereof I have hereunto set my hand, this 20th of February, 1893, in presence of two subscribing witnesses.

BONIFACIO MEDINA-SANTURIO.

Witnesses:
R. H. BRANDON,
R. M. HOOPER.